May 20, 1958 J. W. TAYLOR, JR 2,835,809
LINEAR SAWTOOTH WAVE GENERATOR
Filed Nov. 15, 1955
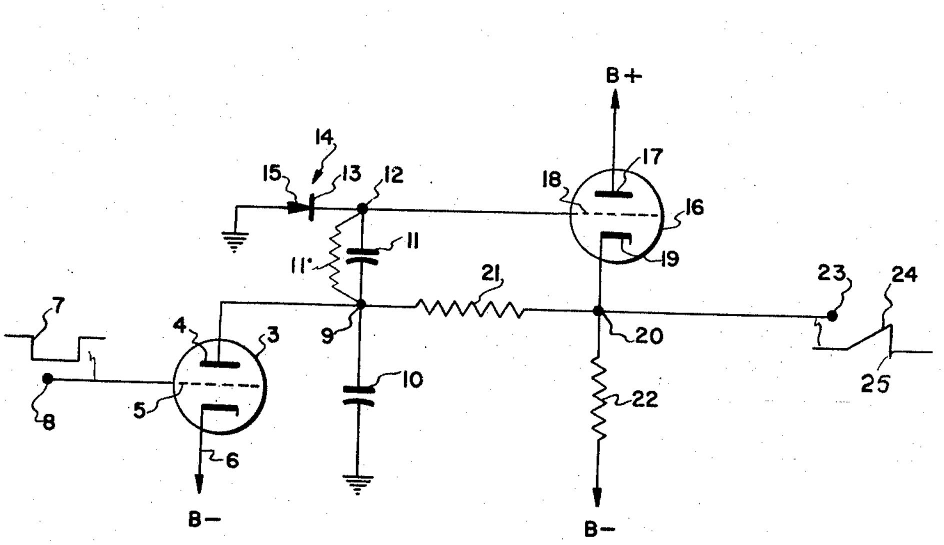
INVENTOR
JOHN W. TAYLOR Jr.
BY
B. L. Zangwill
ATTORNEYS United States Patent Office 2,835,809

Patented May 20, 1958

2,835,809

LINEAR SAWTOOTH WAVE GENERATOR

John W. Taylor, Jr., Baltimore, Md., assignor, by mesne assignments, to the United States of America as represented by the Secretary of the Navy Application November 15, 1955, Serial No. 547,056

3 Claims. (Cl. 250—27)

This invention relates to an improved pulse generator for developing a linear sawtooth waveform and more particularly to a sawtooth generator having an improved bootstrap circuit.

In the prior art as exemplified by U. S. Patent No. 2,597,322, the effectiveness of the bootstrap action and the resultant linearity of the sawtooth output voltage is limited in that the gain of the output cathode follower is less than unity and also that the capacitor developing the sweep voltage derives a portion of its charging current whereby the sweep is made linear from another capacitor.

The instant invention eliminates the disadvantages of the prior art to achieve a sawtooth wave having better linearity with smaller components while reducing not only the duration but the effect of recovery.

The sweep voltage of the present invention is developed across a capacitor which derives its charging current solely from a cathode follower triode whose conduction increases as the rate of charge on the capacitor tends to decrease to thereby maintain said rate of charge constant. In this manner the capacitor charges linearly.

An object of the present invention is to provide a circuit for developing a linear sawtooth voltage.

Another object is to provide a linear sawtooth generator having an improved bootstrap circuit.

Another object of this invention is the provision of a sawtooth generator utilizing smaller components to produce a more linear waveform.

Another object of this invention is to provide a pulse generator for producing a sawtooth waveform having a very short recovery period.

Another object of this invention is to provide a bootstrap circuit for maintaining the charging current of a capacitor constant.

Other objects and many of the attendant advantages of this invention will be readily appreciated as the same becomes better understood by reference to the following detailed description when considered in connection with the accompanying drawing wherein the sole figure is a schematic diagram showing the novel circuit arrangement for producing a linear sawtooth waveform having a short recovery period.

Referring now to the drawing, there is shown a vacuum tube 3, preferably a triode having a plate 4, a grid 5 and a cathode 6. A gating pulse 7 is applied to grid 5 through input terminal 8 to initiate the sawtooth waveform. The cathode 6 is connected to a B— supply while the plate 4 is connected to a junction point 9. One side of a capacitor 10 is connected to point 9 and the other side is connected to ground potential. A relatively large coupling or feedback capacitor 11 in parallel with a relatively large resistor 11' is also connected on one side to point 9 and the other side is connected at a point 12 to the cathode 13 of a diode 14, which has its plate 15 connected to ground. Diode 14 is preferably a silicon or vacuum diode having an extremely high back resistance. A cathode follower triode 16 is provided having a plate 17, a grid 18 and a cathode 19. The plate 17 is connected to a source of B+ supply, grid 18 is connected to point 12; and cathode 19 at junction point 20 is connected to junction 9 through a resistor 21, to the B— supply through a cathode resistor 22, and to an output terminal 23 from which a sawtooth waveform 24 is taken. It will be noted that resistor 21 and capacitor 11 form a feedback loop.

To achieve the objects of the invention the loop gain should substantially approximate the gain of the cathode follower; the circuit components being selected accordingly.

During equilibrium conditions, both tubes are conducting such that capacitor 10 is clamped to the B— supply and consequently junction point 9 is at negative potential. Junction 12 tends to follow the potential on junction 9 but it is prevented from doing so by the conduction of diode 14 until junction point 9 rises above ground potential. This action thereby prevents grid 18 from dropping below ground potential by charging coupling capacitor 11 to the potential difference between ground and B—.

Upon application of the negative gate 7 to the grid 5 of switching tube 3, the tube 3 is cut off and its plate potential starts to rise exponentially toward the potential across cathode resistor 22. The slope of this exponential rise is determined by resistor 21 through which capacitor 10 charges. Normally, the rate of charge of capacitor 10 will tend to decrease as it accumulates a charge.

However, as the charge on capacitor 10 accumulates, the potential at junction 9 increases positively up to and beyond ground potential. Junction 12 coupled through relatively large capacitor 11 tends to follow but as hereinbefore further described it is prevented from doing so by the action of diode 14 until the potential rises above ground and cuts the diode off. The rate of charge of capacitor 10 is linear during this interval wherein it changes from B— to ground potential and then begins to decrease. Thereafter, however, junction 12 follows junction 9 and consequently the increased potential on grid 18 coupled to junction 12 causes cathode follower triode 16 to conduct more heavily which results in a greater potential drop across cathode resistor 22 which is the potential toward which capacitor 10 is rising.

The result is that the charging current of capacitor 10 is made constant and capacitor 10 charges at a linear rate because the increased conduction of triode 16 raises the potential at junction 20 by an amount equal to the increase in potential at junction 9. Capacitor 10 will continue to charge in a linear fashion until triode 16 saturates or for the duration of the negative gate pulse 7. During the charging period of capacitor 10 some of the charge on capacitor 11 may leak off through the high back resistance of the diode and through the triode 16 which may draw negligible grid current. These leakage currents are minimized by resistor 11' in parallel with capacitor 11. Hence, at the termination of the negative gate pulse, tube 3 becomes conducting; and capacitor 10 in rapidly discharging will bring the potential of junction 9 quickly back down to B—. Due to the negligible loss of charge on capacitor 11 the potential at junction 12 is prevented from dropping below ground an amount sufficient to cut triode 16 off. Triode 16 continues to conduct and the cathode waveform will duplicate that appearing at the grid. However, any departure from ground potential at junction 12 will cause diode 14 to immediately conduct to charge capacitor 11 and bring it back to its equilibrium condition. As the cathode follower tube 16 continuously conducts recovery time is no longer dependent on the cut off characteristics of the tube 16 but depends only on the forward resistance of the diode 14. To the extent that the forward resistance of the diode 14 is negligible, and very little charged has leaked off capacitor 11, the equilibrium condition or recovery period illustratively shown at 25 is of negligible amplitude and consequently the voltage from which the sawtooth waveform starts is not noticeably affected.

It may be seen from the operation that capacitor 11 no longer has to supply the charging current for capacitor 10 during the sweep period and consequently may be made smaller. Its only departure from equilibrium condition is due to negligible conduction through the high back resistance of the diode and to grid current which is very slight because of the long time constant of capacitor 11 and resistance 21 and the high grid to cathode impedance of triode 16. These leakage currents are further absorbed by resistor 11' in parallel therewith. Hence recovery is quickly achieved in that it depends only on the negligible forward resistance of the diode 14 and the amount of departure of capacitor 11 from equilibrium.

Obviously many modifications and variations of the present invention are possible in the light of the above teachings; e. g. with a change in clamp tube 3 and a reversal of diode 14, the circuit may be adapted to the generation of a negative sawtooth waveform. It is therefore to be understood that within the scope of the appended claims the invention may be practiced otherwise than as specifically described.

What is claimed is:

1. A sawtooth generator comprising a cathode follower triode including a cathode resistor, an RC circuit in parallel with said cathode resistor, of said triode, a negative feedback loop comprising a second RC circuit, including a capacitor and resistor in parallel, connected between cathode and grid of said triode, a diode circuit having a high back resistance, one of the electrodes of said diode being connected to the grid of said triode, and the other electrode to said first RC circuit, whereby to maintain the charging current in said first RC circuit constant.

2. A sawtooth generator comprising, a first triode having its cathode connected to a source of negative potential, a second triode having its cathode connected to a source of negative potential, a capacitor connected between the plate of said first triode and ground, a second capacitor connected to the plate of said first triode and to the grid of said second triode, a diode having its plate connected to ground and its cathode to the grid of said second triode, a first resistor connected to the plate of said first triode and the cathode of said second triode, a second resistor connected between the last said cathode and ground, said first triode adapted to cause said first named capacitor to charge through said first resistor, and said second capacitor adapted to couple the potential on said plate of said first triode to the grid of said second triode whereby as the rate of charge on said first capacitor tends to decrease said second triode will conduct more heavily to maintain the rate of charge constant, and means for deriving a sawtooth waveform across the cathode of said second triode.

3. A sawtooth pulse generator comprising a first triode having a grid connected to receive a gate pulse, said pulse controlling the conduction and nonconduction states of said triode; a capacitor; means connecting said capacitor to said triode so as to enable said capacitor to charge during one of said states and to discharge quickly during the other of said states; a cathode follower circuit comprising a second triode and cathode resistor, said triode having a plate connected to a high potential as compared to potentials at other points of said generator; means connecting said first capacitor across said resistor for charging said capacitor in accordance with the voltage drop across said resistor; means for controlling conduction current of said cathode follower circuit, the last said means comprising a diode, a second capacitor having one end connected to the grid of said second triode and to an electrode of said diode, a resistor across said second capacitor, the other end of said second capacitor being electrically connected to an end of said first capacitor; and an output connection from said cathode resistor.

References Cited in the file of this patent

UNITED STATES PATENTS

| | | |
|---|---|---|
| 2,606,287 | McCoy | Aug. 5, 1952 |
| 2,688,075 | Palmer | Aug. 31, 1954 |
| 2,691,101 | Casey | Oct. 5, 1954 |
| 2,735,007 | McCurdy | Feb. 14, 1956 |
| 2,743,357 | Casey | Apr. 24, 1956 |